US012649502B1

(12) United States Patent
Slyadnev et al.

(10) Patent No.: US 12,649,502 B1
(45) Date of Patent: Jun. 9, 2026

(54) DEVICE FOR DETECTION OF DEFECTS IN WELDED RAIL JOINTS

(71) Applicant: PULSAR FZC, Sharjah (AE)

(72) Inventors: Anatoly Slyadnev, Moscow (RU);
Kirill Slyadnev, Moscow (RU)

(73) Assignee: PULSAR FZC, Sharjah (AE)

( * ) Notice: Subject to any disclaimer, the term of this patent is extended or adjusted under 35 U.S.C. 154(b) by 0 days.

(21) Appl. No.: 19/447,123

(22) Filed: Jan. 13, 2026

(51) Int. Cl.
B61K 9/10 (2006.01)
G01N 29/265 (2006.01)

(52) U.S. Cl.
CPC ............. B61K 9/10 (2013.01); G01N 29/265 (2013.01); G01N 2291/106 (2013.01); G01N 2291/2623 (2013.01); G01N 2291/267 (2013.01)

(58) Field of Classification Search
CPC .. B61K 9/10; G01N 29/265; G01N 2291/106; G01N 2291/2623; G01N 2291/267
USPC .......................................................... 73/588
See application file for complete search history.

(56) References Cited

U.S. PATENT DOCUMENTS

| | | | |
|---|---|---|---|
| 4,487,071 A | 12/1984 | Pagano et al. | |
| 4,700,574 A | 10/1987 | Turbe | |
| 9,816,964 B1 * | 11/2017 | Nguyen-Dinh | ..... G01S 15/8925 |
| 2010/0185402 A1 * | 7/2010 | Pielli | ...................... G01N 29/30 |
| | | | 702/39 |

FOREIGN PATENT DOCUMENTS

| | | | |
|---|---|---|---|
| RU | 2126339 C1 | 2/1999 | |
| RU | 2309402 C2 | 10/2007 | |
| RU | 2380259 C1 | 1/2010 | |
| RU | 195883 U1 | 2/2020 | |
| RU | 198395 U1 | 7/2020 | |

OTHER PUBLICATIONS

Search report in RU 2025127458, dated Nov. 14, 2025.

* cited by examiner

*Primary Examiner* — Nathaniel T Woodward
(74) *Attorney, Agent, or Firm* — Bardmesser Law Group

(57) ABSTRACT

Non-destructive inspection of welded rail joints by ultrasound phase-array transducers in one device, precise positioning non-destructive inspection probes and moving the probes in longitudinal and transverse directions. Two scanners have ultrasound phase-array transducers and emission control unit for sequential or simultaneous inspection of welded joints using (i) two ultrasound phase-array transducers are directed to each other and operate separately, wherein the transducers provide a beam sector of 36-75 degrees; (ii) two ultrasound phase-array transducers are directed to each other and operate separately, wherein the transducers provide a beam sector of 26-24 degrees from the tread surface during longitudinal movement; and/or (iii) two ultrasound phase-array transducers are directed to each other, one transducer emits a transverse wave with a predetermined angle from the tread surface to the base of the rail, while the other transducer receives a longitudinal wave that occurs only when a vertical crack exists in the rail.

17 Claims, 5 Drawing Sheets

20          21

20          21

22

DEVICE FOR DETECTION OF DEFECTS IN WELDED RAIL JOINTS

BACKGROUND OF THE INVENTION

Field of Invention

The invention relates to non-destructive inspection, and, in particular, to use of ultrasound waves for visualization of inner structure of an object and for detection of internal defects in objects, such as in welded rail joints.

Conventional Art

There is a known device for inspection of railroad rails according to Russian utility model patent RU195883 (published on Feb. 7, 2020). The device comprises at least one scanner configured to move, during measurements, at least one ultrasound probe for non-destructive inspection along cross-section outline of a visible portion of a rail. The ultrasound probe is secured on a flexible drive. The device is configured to move, during measurements, the scanner along the rail.

A limitation of the known device is low certainty of detection and evaluation of defects due to use of only one method of inspection of welded rail joints, which increases time for measurements and requires re-adjustment of the device for using another inspection method. These factors cause a risk of skipping defects and lack of evaluation thereof, since the defects may have different orientations and positions in welds, which require using a number of inspection methods.

The invention is directed to attaining a technical effect of increasing certainty of detection and evaluation of defects owing to use of three inspection methods in one device, which methods provide inspection of welded rail joints by ultrasound phase-array transducers, precise positioning non-destructive inspection probes and possibility of moving the probes in longitudinal and transverse directions relative to selected cross-section of the rail.

SUMMARY OF THE INVENTION

The technical effect is attained by a device comprising two scanners with ultrasound phase-array transducers and an emission control unit for ultrasound phase-array transducers. The scanners are configured to provide sequential or simultaneous inspection of welded joints using three different methods, in particular, (i) an echo method implemented in a configuration, where two ultrasound phase-array transducers are directed to each other and operate separately, wherein the transducers are controlled by the emission control unit for ultrasound phase-array transducers and provide a beam sector of 36 to 75 degrees; and/or (ii) a shadow-mirror method implemented in a configuration, where two ultrasound phase-array transducers are directed to each other and operate separately, wherein the transducers are controlled by the emission control unit for ultrasound phase-array transducers and provide a beam sector of 26 to 24 degrees from the tread surface during longitudinal movement; and/or (iii) a delta method implemented in a configuration, where two ultrasound phase-array transducers are directed to each other, wherein one transducer is controlled by the emission control unit for ultrasound phase-array transducers and emits a transverse wave with a predetermined angle from the tread surface to the base of the rail, while the other transducer receives a longitudinal wave that occurs only when a vertical crack exists in the rail.

In one embodiment, the device is configured to move the scanners along cross-section outline of the rail visible portion simultaneously or independently during measurements.

In one embodiment, the device is configured to move the scanners along the rail during measurements.

In one embodiment of the device, the scanners are equipped with flexible drives cinematically engaged with an external drive, and each of the scanners bears at least one ultrasound phase-array transducer.

In one embodiment of the device, the flexible drives are provided in form of chains, and the scanners are equipped with chain guides, which assure movement of the chains and the ultrasound phase-array transducers attached thereto along cross-section outline of the rail.

In one embodiment of the device, the external drive is provided in form of a chain-based manual drive engaged with the chain of the scanner via a gear.

In one embodiment, the device is secured on a mobile platform configured to move manually along the rail. The platform is equipped with support wheels, which are movable vertically to compensate wear of the upper surface of the rail and to provide a movement path of the scanners along cross-section outline of the rail.

In one embodiment, the mobile platform with the device comprises transportation handles and separate mobile wheels for transporting beyond the rail.

The claimed device is installed on a rail surface that provides mechanical moving of the two scanners along the rail profile in longitudinal and transverse directions. Moving along longitudinal axis of the rail is provided using a manual drive, while moving along cross-section outline of the rail is provided using the flexible drive. This configuration allows conducting defect detection for whole welded joint of a complex-shape object like a rail, and, therefore, it allows increasing certainty of detection and evaluation of defects in welded rail joints.

In one embodiment intended for rail-welding facilities, the device is secured in a stationary setup equipped with a lifting mechanism, preferably with an electric drive, for lifting the device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention. In the drawings.

Figure 4:
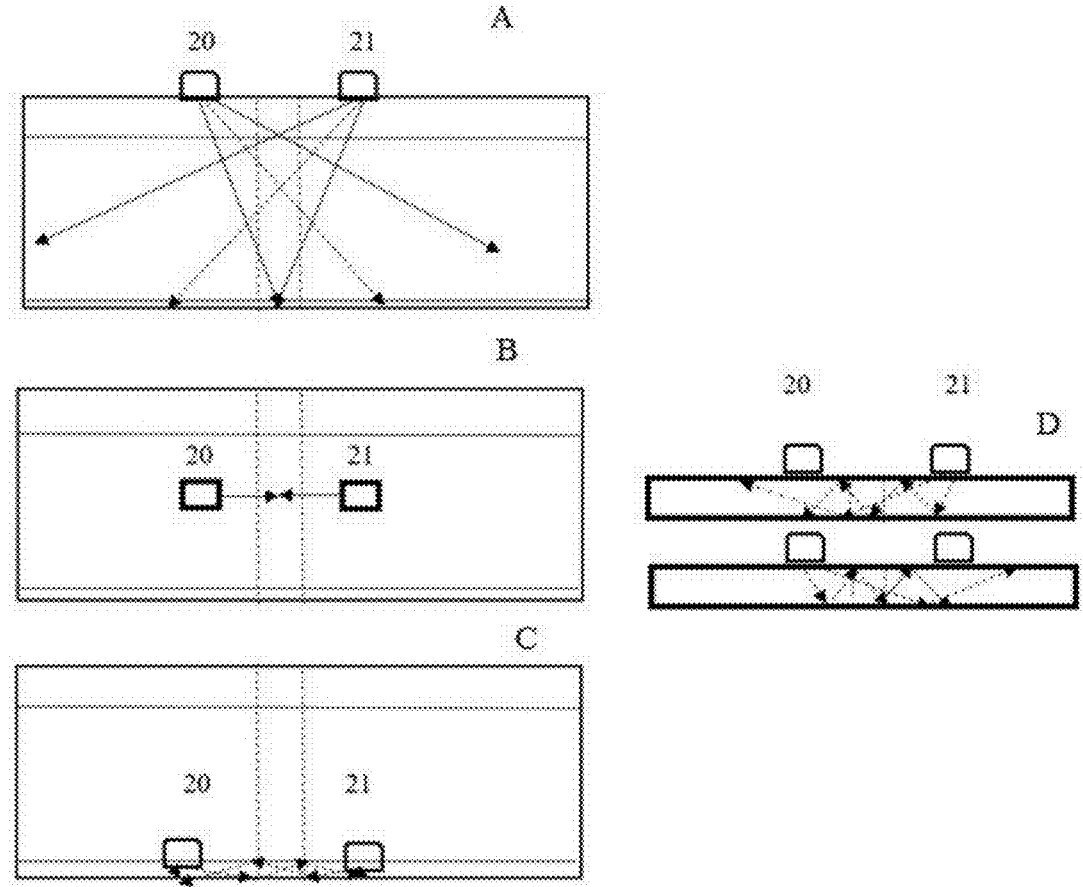

FIG. 4 schematically shows scanning a rail by the device using an echo method.

Figures 5, 6:
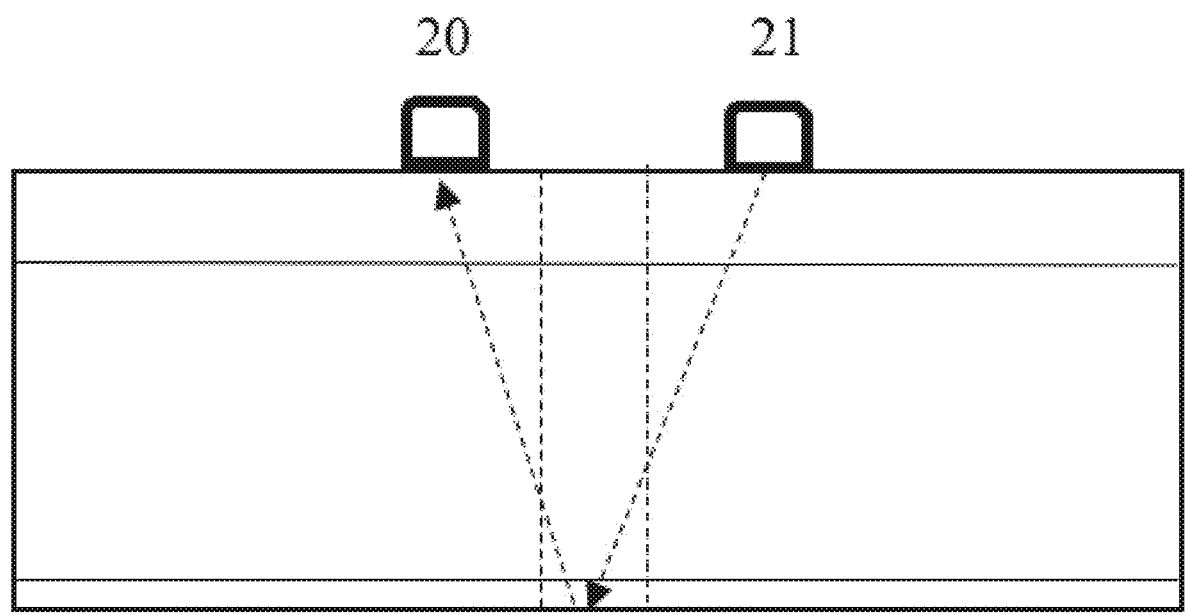

FIG. 5 schematically shows scanning a rail by the device using a shadow-mirror method.

FIG. 6 schematically shows scanning a rail by the device using a delta method.

DETAILED DESCRIPTION OF EMBODIMENTS OF THE INVENTION

Reference will now be made in detail to the preferred embodiments of the present invention, examples of which are illustrated in the accompanying drawings.

Figure 1:
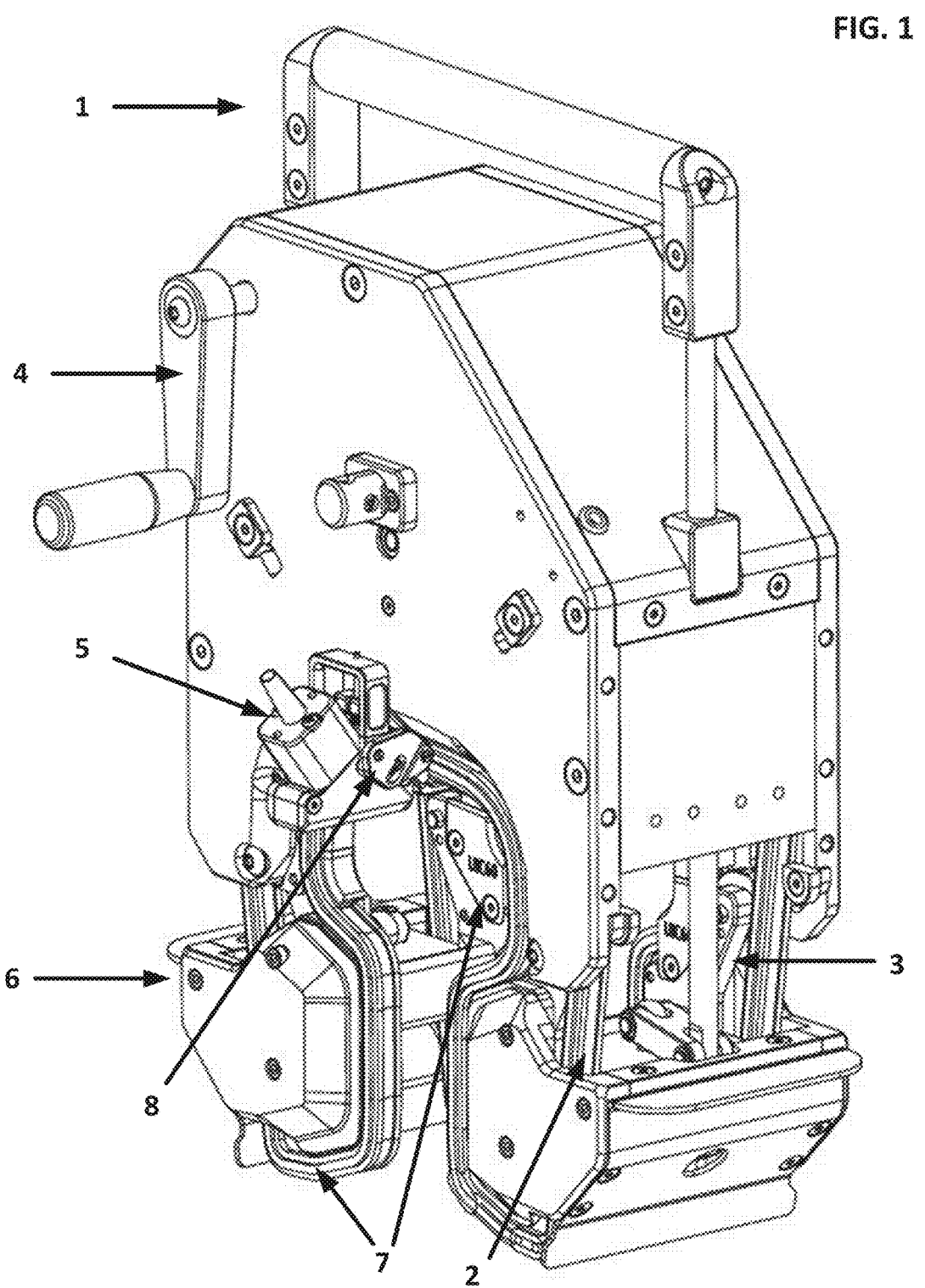
FIG. 1 shows a general view of the device as assembled.

FIG. 1 shows a general view of the device as assembled. In the figure, reference designator 1 denotes a handle for carrying the device and for fixing chain units on a rail. Reference designator 2 denotes a chain-based drive. Reference designator 3 denotes a lever mechanism for fixing the chain units in open state and in closed state. Reference designator 4 denotes a handle for transverse movement drive scanners with ultrasound phase-array transducers along the weld outline. (In other words, "transverse" is defined as in a plane perpendicular to the direction of the rail tracks.) Reference designator 5 denotes a scanner with ultrasound phase-array transducers. A total of at least two transducers is used, as shown in FIG. 1, in one exemplary embodiment.

Reference designator 6 denotes a chain unit. Reference designator 7 denotes chain guides. Reference designator 8 denotes a carriage for mounting the scanners with ultrasound phase-array transducers.

Figure 2:
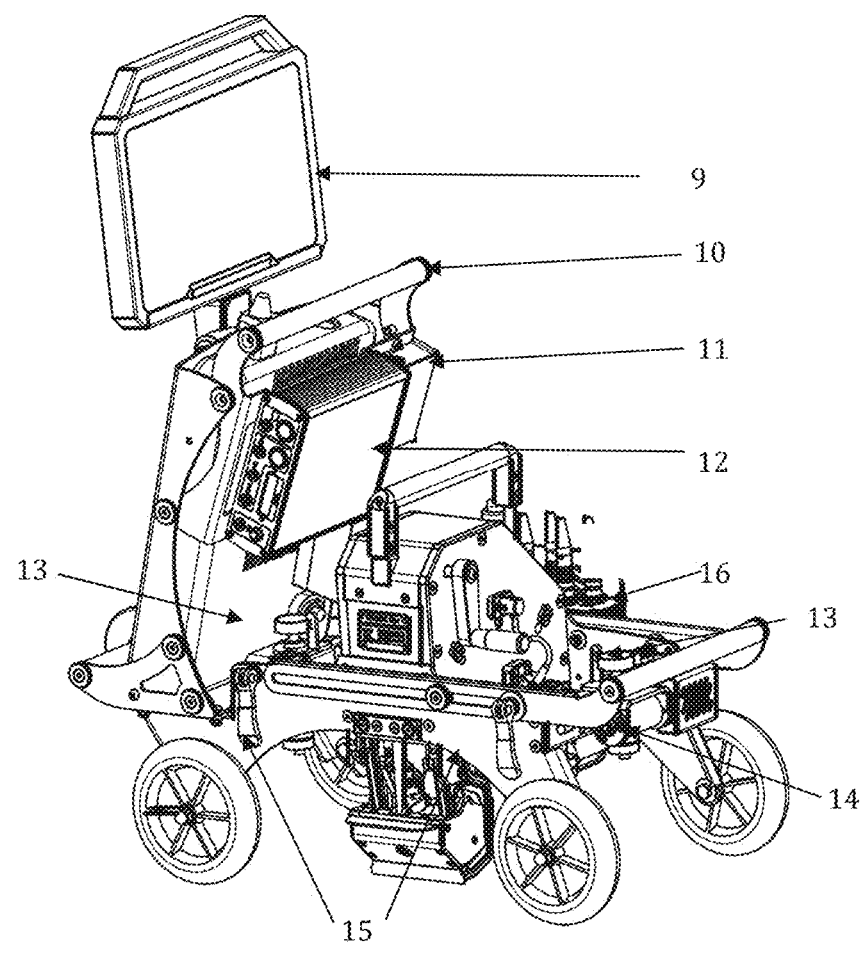
FIG. 2 shows the device installed on a mobile platform.

FIG. 2 shows the device installed on a mobile platform. In the figure, reference designator 9 denotes a device for visualization of inspection results. Reference designator 10 denotes a handle for moving the platform along the rail. Reference designator 11 denotes a Wi-Fi transmitter. Reference designator 12 denotes an emission controller for ultrasound phase-array transducers. Reference designator 13 denotes an adjuster of rail vertical wear compensator. Reference designator 14 denotes support wheels. Reference designator 15 denotes a pressing mechanism. Reference designator 16 denotes a switch box.

Figure 3:
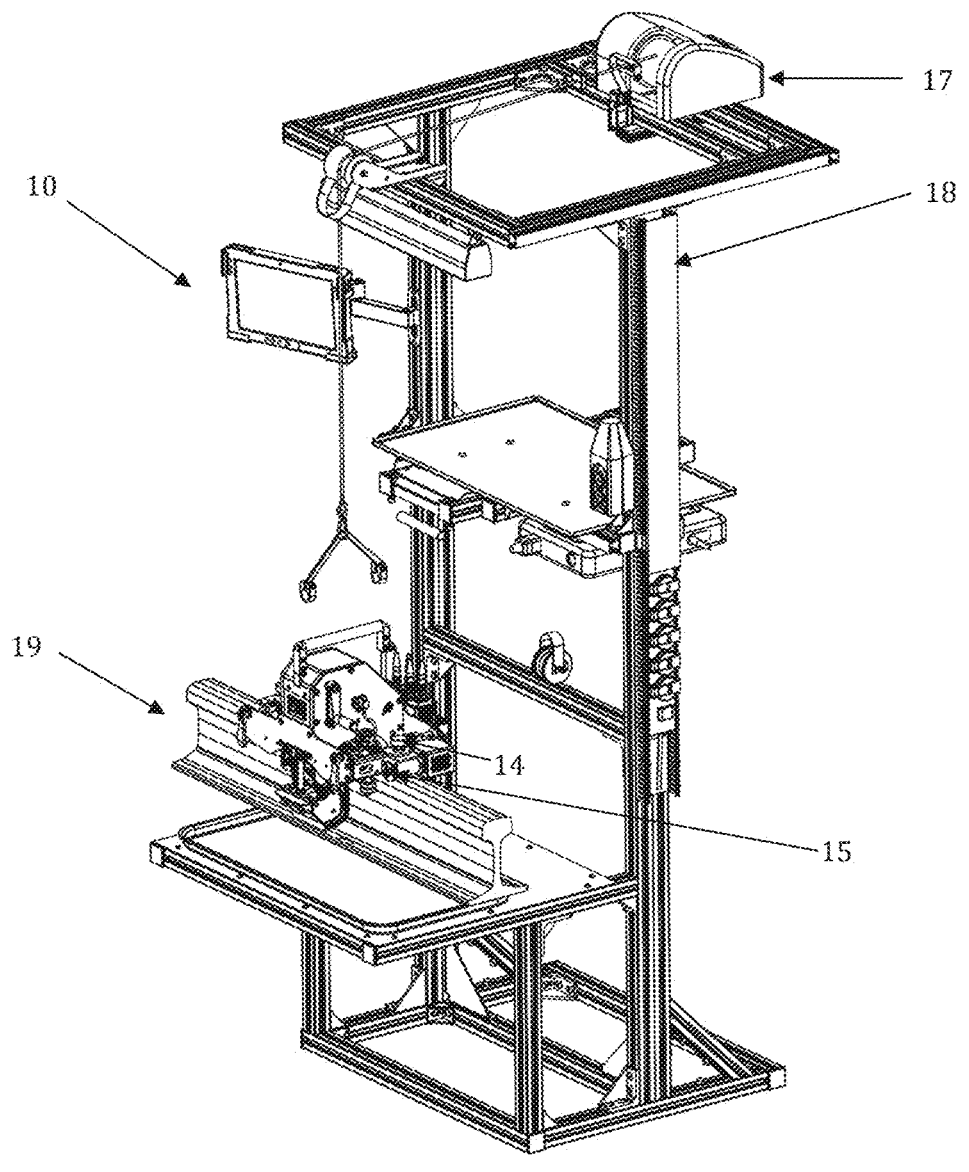
FIG. 3 shows an option of installation of the device for inspection of welded rail joints in rail-welding facilities.

FIG. 3 shows an option of installation of the device for inspection of welded rail joints in rail-welding facilities. In the figure, reference designator 17 denotes an electrical hoist of the lifting mechanism. Reference designator 18 denotes a rack. Reference designator 19 denotes a rail.

FIG. 4 schematically shows scanning a rail by the device using an echo method. In the figure, reference designator 20 denotes a left ultrasound phase-array transducer. Reference designator 21 denotes a right ultrasound phase-array transducer. Graph A illustrates a beam path near a welded joint in the rail head in an elevation view. Graph B illustrates a beam path in the rail web. Graph C illustrates a beam path in the rail base wings. Graph D illustrates a beam path in a top view, when the ultrasound phase-array transducers are located on lateral surfaces of the rail head, on the rail web and on the rail base wings.

FIG. 5 schematically shows scanning a rail by the device using a shadow-mirror method. In the figure, reference designator 20 denotes a left ultrasound phase-array transducer. Reference designator 21 denotes a right ultrasound phase-array transducer.

FIG. 6 schematically shows scanning a rail by the device using a delta method. In the figure, reference designator 20 denotes a left ultrasound phase-array transducer. Reference designator 21 denotes a right ultrasound phase-array transducer. Reference designator 22 denotes a defect in form of a vertical crack.

The invention may be implemented as the device comprising two scanners (5) with ultrasound phase-array transducers (20) and (21) directed to each other and to the axis of the weld to be inspected, support wheels (14) with adjusters (13) of rail vertical wear compensators, which allow for horizontal installation of the scanners. The device may be manually moved along the rail axis. The scanner (5) with ultrasound phase-array transducers (20) and (21) may be moved along cross-sectional outline of the rail.

The device also includes the handle (1) for carrying and installing the device on the support wheels (14) above a welded joint of the railroad rail to be inspected. The device comprises chain guides (7) of the chain-based drive (2), which may be diverged by the lever mechanism (3) during installation of the device on the rail. The support wheels (14) are equipped with compensators of rail vertical wear with adjusters (13) for adjusting contact between the chain guides (7) of the chain-based drive (2) and the rail base wings, when necessary. The handle for transverse movement drive (4), through the chain-based drive (2), provides synchronous movement of the scanners (5) with ultrasound phase-array transducers in a direction transverse to the rail.

The device also includes the emission controller for ultrasound phase-array transducers (12) that allows changing direction of rays from the ultrasound phase-array transducers (20) and (21) to provide sequential or simultaneous inspection of welded joints by the following methods (operating modes): (i) an echo method (operating mode) implemented in a configuration, where the two ultrasound phase-array transducers (20) and (21) are directed to each other and operate separately and provide a beam sector of 36 to 75 degrees; and/or (ii) a shadow-mirror method (operating mode) implemented in a configuration, where the two ultrasound phase-array transducers (20) and (21) are directed to each other and operate separately, wherein the transducers are controlled by the emission controller for ultrasound phase-array transducers and provide a beam sector of 26 to 24 degrees from the tread surface during longitudinal movement; and/or (iii) a delta method (operating mode) implemented in a configuration, where the two ultrasound phase-array transducers (20) and (21) are directed to each other, wherein the first transducer (21) under control of the controller (12) emits a transverse wave with a predetermined angle from the tread surface to the base of the rail, while the second transducer (20) receives a longitudinal wave that occurs only when a vertical crack exists in the rail.

The device operates as follows. The device is carried using the handle (1) and installed on the support wheels (14) above the welded joint of the railroad rail to be inspected. Then the device is fixed with the pressing mechanism (15). During this phase, the chain guides (7) of the chain-based drive (2) are diverged in advance by the lever mechanism (3). After installation of the device on the rail, the chain guides (7) are converged by the lever mechanism (3) and contact between the chain units (6) and the rail base wings is adjusted using the compensators (13) of rail vertical wear (which also may be referred to as "adjuster of rail vertical wear compensator"), when necessary. The device is positioned in the weld center by moving the device on the support wheels (14) along the rail axis. The device is fixed on the rail by levers of the pressing mechanism (15). The scanners (5) with ultrasound phase-array transducers are moved, using the chain-based drive (2), in a direction that is transverse to the rail, using the handle for transverse movement drive (4). Sequential or simultaneous inspection of welded joints is conducted by the echo method and/or the shadow-mirror method and/or the delta method, using the emission controller for ultrasound phase-array transducers (12).

A display for operator use may be provided, where the operator can select various operating modes from a menu, e.g., only mode (i), only mode (ii), only mode (iii), or mode (ii)/mode (iii). All three modes are available to the operator in any sequence, with each mode being used in its own control zone: mode (i), see FIG. 4, in the cross-section of the rail, mode (ii), see FIG. 5, and mode (iii), see FIG. 6, in the longitudinal section of the rail, measured from the running surface, in one exemplary embodiment.

The control display, electronic flaw detection unit, autonomous power supply unit and mechanical scanning module with sensors on phased arrays is shown in FIG. 2 mounted on a mobile platform, in one exemplary embodiment.

Typical movement speed of the transducers is rarely more than 100 mm/second, with the emitted ultrasonic frequency of 2.5 MHz, in one exemplary embodiment. Note that scanning too fast can result in missed small defects in the weld. The pulses emitted by the transducers are on the order at least 1500 pulses per second, in one exemplary embodiment.

To track the movement of ultrasonic sensors in the longitudinal and transverse directions of the rail in one embodiment, two incremental encoders are used, one of which is installed inside the mechanical drive module of the ultrasonic sensors (transverse tracking), and the other (longitudinal tracking) on the axis of the movable platform, see FIG. 2.

Generally, the time needed to inspect a single weld varies, depending on operator experience, but typical times are about 3 minutes.

After return of the scanners (5) with ultrasound phase-array transducers to the rail head, the levers of the pressing mechanism (15) are released and the device is moved on the support wheels (14) away from the weld center in one direction or in the other direction along the rail axis.

Thus, the technical effect of the invention is attained, as measurements using three methods of inspection of welded rail joints are conducted by ultrasound phase-array transducers in one device, while precise positioning of the device is provided and the multi-element ultrasound transducers may be moved relative to the selected cross-section of the rail in longitudinal and transverse directions in close vicinity of the weld along the rail outline, which allows increasing certainty of detection and evaluation of weld defects.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

What is claimed is:

1. A device for detection of defects in welded rail joints, the device comprising:

a display configured to provide an operator with operating mode options;

two scanners, each with an ultrasound phase-array transducer;

an emission controller for the ultrasound phase-array transducers;

the scanners configured to provide inspection of the welded rail joints using (i) the two ultrasound phase-array transducers directed at each other, operating separately and generating a beam sector of 36 to 75 degrees;

(ii) the two ultrasound phase-array transducers directed towards each other and operating separately, wherein the transducers generate a beam sector of 26 to 24 degrees from a tread surface during longitudinal movement along a rail; and/or (iii) the two ultrasound phase-array transducers directed towards each other, wherein one of the two transducers emits a transverse wave from the tread surface to a base of the rail, while the second transducer receives a longitudinal wave that occurs only when a vertical defect exists in the rail, wherein the scanners are configured to perform (i), (ii) and/or (iii) singly or sequentially, in any order, based on selection by the operator, and wherein the defects are shown on the display after the inspection.

2. The device of claim 1, wherein the scanners are configured to move along a cross-section outline of a visible portion of the rail simultaneously during the detection.

3. The device of claim 1, wherein the scanners are configured to move along a cross-section outline of a visible portion of the rail independently during the detection.

4. The device of claim 1, wherein the scanners are configured to move along the rail during measurements.

5. The device of claim 1, wherein the scanners include flexible drives kinematically engaged with an external drive, and the ultrasound phase-array transducers are secured on the scanners.

6. The device of claim 5, wherein the flexible drives are chains, and the scanners include chain guides to guide movement of the chains and of the ultrasound phase-array transducers attached thereto along a cross-section outline of the rail.

7. The device of claim 5, wherein the external drive is a chain-based manual drive engaged with a chain of the scanner chain via a gear.

8. The device of claim 1, further comprising a mobile platform configured to move the device manually along the rail when the device is mounted on the mobile platform, and includes support wheels, which are movable vertically to compensate for wear of an upper surface of the rail and to provide a movement path of the scanners along a cross-section outline of the rail.

9. The device of claim 8, wherein the mobile platform with the device comprises transportation handles and separate mobile wheels for transporting beyond the rail.

10. The device of claim 1, wherein the device is secured in a stationary jig that includes an electrically driven lifting mechanism, for lifting the device.

11. A device for detection of defects in welded rail joints, the device comprising:

two scanners, each with an ultrasound phase-array transducer;

an emission controller for the ultrasound phase-array transducers; and a display configured to show available operating modes;

the scanners configured to detect the defects using the operating modes (i) the two ultrasound phase-array transducers directed at each other, operating separately and generating a beam sector of 36 to 75 degrees;

(ii) the two ultrasound phase-array transducers directed towards each other and operating separately, wherein the transducers generate a beam sector of 26 to 24 degrees from a tread surface during longitudinal movement along a rail; and/or (iii) the two ultrasound phase-array transducers directed towards each other, wherein one of the two transducers emits a transverse wave from the tread surface to a base of the rail, while the second transducer receives a longitudinal wave that occurs only when a vertical defect exists in the rail, wherein (i), (ii) and/or (iii) can be performed singly or sequentially, in any order, and wherein the defects are shown on the display.

12. The device of claim 11, wherein the scanners are configured to move along a cross-section outline of a visible portion of the rail simultaneously during the detection.

13. The device of claim 11, wherein the scanners are configured to move along a cross-section outline of a visible portion of the rail independently during the detection.

14. The device of claim 11, wherein the scanners are configured to move along the rail during measurements.

15. The device of claim 11, wherein the scanners include flexible drives kinematically engaged with an external drive, and the ultrasound phase-array transducers are secured on the scanners.

16. The device of claim 15, wherein the flexible drives are chains, and the scanners include chain guides to guide movement of the chains and of the ultrasound phase-array transducers attached thereto along a cross-section outline of the rail.

17. The device of claim 15, wherein the external drive is a chain-based manual drive engaged with a chain of the scanner chain via a gear.

\* \* \* \* \*